Jan. 19, 1926.

P. G. LEONARD 1,570,069

PIPE GRIPPING DEVICE

Filed Feb. 16, 1925

Witnesses:

Inventor:
Peter Gustaf Leonard
By Joshua R. H. Potts
His Attorney.

Patented Jan. 19, 1926.

1,570,069

UNITED STATES PATENT OFFICE.

PETER GUSTAF LEONARD, OF WEST TULSA, OKLAHOMA.

PIPE-GRIPPING DEVICE.

Application filed February 16, 1925. Serial No. 9,493.

*To all whom it may concern:*

Be it known that I, PETER GUSTAF LEONARD, a subject of the King of Sweden, and a resident of the city of West Tulsa, county of Tulsa, and State of Oklahoma, have invented certain new and useful Improvements in a Pipe-Gripping Device, of which the following is a specification.

My invention pertains to a pipe gripping device, and has for its main object to provide a reliable, safe gripping device or tubing catcher which will positively catch within a pipe and remain in operative position therein, and without rupturing or cutting through the pipe wall.

Other objects will appear hereinafter.

The invention consists in the combinations and arrangements of parts hereinafter described and claimed.

Figure 1:
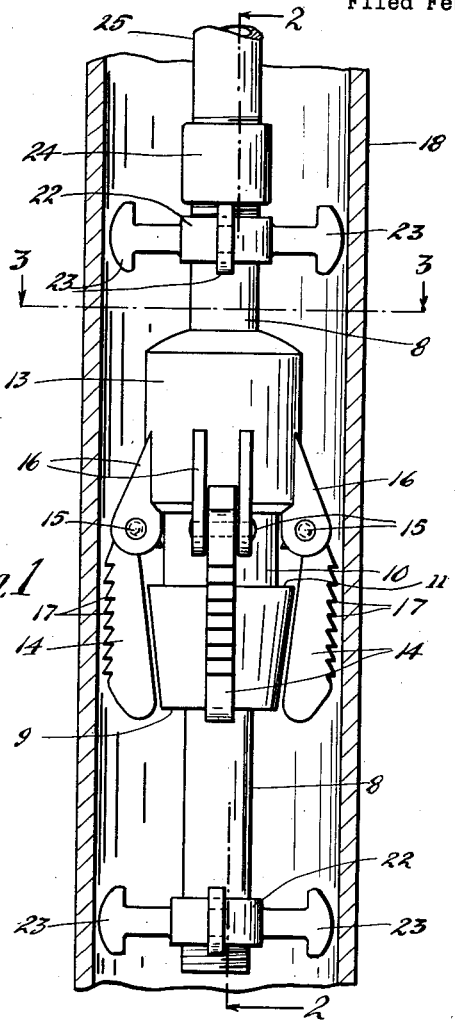
Figure 2:
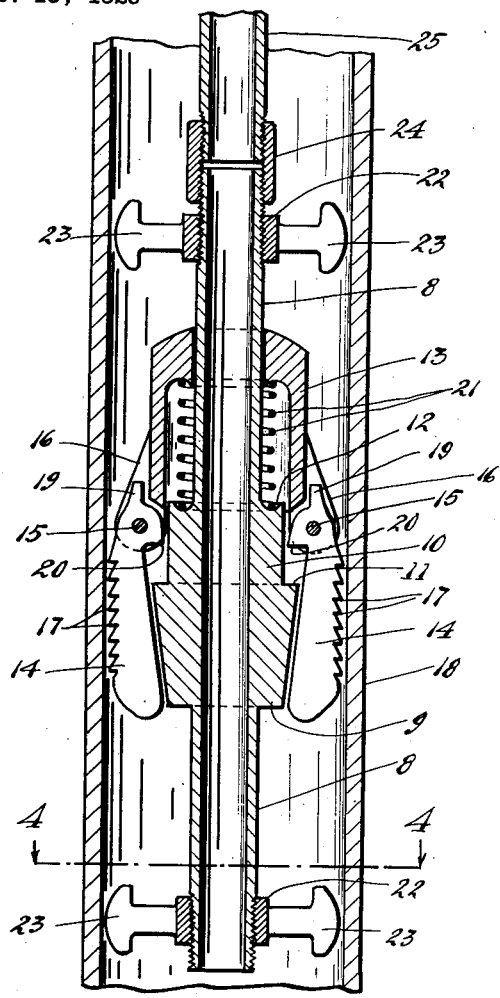

The invention will be best understood by reference to the accompanying drawings forming a part of this specification, and in which, Fig. 1 is an elevational view of my gripping device, shown in an inoperative position in a pipe;

Fig. 2 is a vertical sectional view thereof taken on line 2—2 of Fig. 1; and

Figure 3:
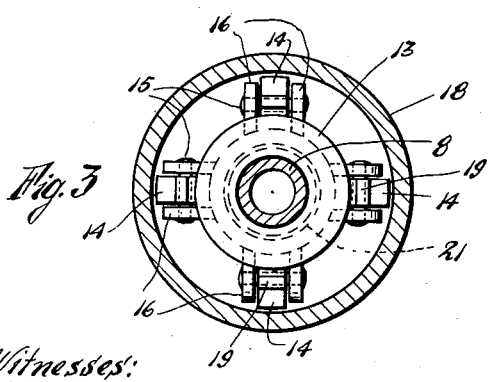
Figure 4:
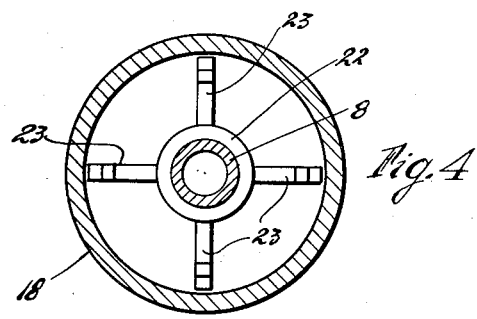

Figs. 3 and 4 are cross sectional views taken on lines 3—3 and 4—4 of Figs. 1 and 2, respectively.

The forms of invention illustrated comprises a tube or member 8 which is provided with a conical portion 9 and a neck 10 with a conical portion 9 and a neck 10 thereon, preferably integral with the tube, an annular ledge or hook means 11 being provided at the junction of conical portion 9 and its neck 10, and a spring seat 12 is formed on the upper end of said neck. A sleeve 13 is mounted to slide on said tube and to move over said neck, and gripping elements 14 are swingably mounted on and normally depend from pivot pins 15 placed in ears 16 formed around said sleeve, said elements being broader at their free lower ends to cooperate with said conical portion for moving their teeth 17 into positive gripping engagement with the surrounding pipe 18, into which the device is inserted. A finger 19 extends above each gripping element to engage the sleeve and limit the outward swinging movement of the element, especially when entering the pipe. A hook 20 is formed on each element 10, to be engaged and actuated by the hook means or ledge 11 on the conical portion, for positively retaining the elements normally in released or inoperative position, and also to positively withdraw or release the elements after they have been firmly driven into pipe gripping position.

Means is provided, which cooperates with the gripping elements 14 and the conical portion 9, for normally retaining the elements inoperative, and to move said elements into positive gripping position upon sudden descent of the device. This means preferably includes a coiled spring 21 mounted in sleeve 13 and bearing between said sleeve and the seat 12 on the neck of conical portion 9, said spring being arranged and constructed of proper size and material to normally support less than the total weight of sleeve 13 and the attached gripping elements 14, so that the sleeve descends on neck 10 and the hooks 20 substantially rest on the ledge 11 when the device is gradually or normally lowered into a pipe.

Guide means 22, with guide arms 23, extending close to the inner surface of the surrounding pipe, are mounted on tube 8 above and below the sleeve and elements; and a threaded collar 24 with an attached tube 25, similar to tube 8, is threaded on said tube 8, for lowering the tube with the gripping device into the pipe, to adapt said tubing for use in pumping oil therethrough from the well to the surface.

In installing or lowering tubing equipped with my device, the tubing with the device is lowered into the pipe at a reasonable rate of speed, as by means of the tube 25, until the lower end of the tubing reaches the bottom of the well; but, in case such tubing with my gripping device attached thereto should drop or descend suddenly, then the spring 21 becomes effective to separate sleeve 13 from the conical portion 9, in other words, the spring becomes sufficiently strong to force the member 8 with the conical portion 9 downward at a faster rate of speed than sleeve 13, whereby the conical portion forces the gripping elements 14 into engagement with the pipe, and this engagement stops the movement of the elements and sleeve whereupon the sleeve forces the elements into more positive contact with said pipe.

If it is desired to remove the tubing with the gripping device, the tube 25 and tube 8 with the conical portion 9 can be moved upwards until ledge 11 engages hook portions 20 on the elements 14 to force said elements into released position, whereupon the tubing with the device may be withdrawn; and if desired, the tube 25 with collar 24 may also be unthreaded from tube 8 and withdrawn therefrom.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A pipe gripping device comprising a member with gripping elements pivoted thereon, spring actuated means in said member and having a portion for moving said elements into pipe gripping position, and stop means to engage said gripping elements and force release movement thereof.

2. A pipe gripping device comprising a member with gripping elements mounted thereon, means movably mounted in said member and having a portion for forcing said elements into pipe gripping position, and means on the gripping elements for limiting excess outward movement of said elements.

3. A pipe gripping device comprising a sleeve, gripping elements pivotally depending from said sleeve, a member slidable in said sleeve and having a conical portion to swing said elements outward, and a spring between said sleeve and conical portion and constructed to normally permit said elements to depend in their inoperative position, but to move said conical portion on said elements and swing the elements outward upon sudden drop of the device.

4. A pipe gripping device comprising a member with gripping elements mounted thereon and having lugs to engage said member and prevent excess outward movement of said elements, and spring actuated means arranged to leave said elements inoperative during normal descent of said device but to force said elements into operative position upon sudden drop of the device.

5. A pipe gripping device comprising a member with gripping elements pivoted thereon, spring actuated means slidable in said member and having a conical portion for moving said elements into pipe gripping position, and stop means on said elements and conical portion to engage and force release movement of said elements.

6. A pipe gripping device comprising a member with gripping elements pivoted thereon, spring actuated means slidably mounted in said member and having a portion for moving said elements into pipe gripping position, and fingers on said gripping elements for limiting excessive outward movement thereof.

7. A pipe gripping device comprising a tube with a conical portion and a neck thereon, guide means on said tube for guiding it centrally in a pipe, a sleeve slidably supported on said tube, gripping elements swingably mounted on said sleeve, means on said elements for preventing excessive outward movement thereof, cooperating hook means on said elements and said conical portion to engage and force release movement of said elements, and a spring seated in said sleeve and bearing on said neck for moving said conical portion to force said elements into pipe gripping position upon sudden descent of said device but to permit said sleeve and elements to move to inoperative position upon gradual descent of said device.

In testimony whereof I have signed my name to this specification.

PETER GUSTAF LEONARD.